(12) United States Patent
Kageyama et al.

(10) Patent No.: US 11,685,190 B2
(45) Date of Patent: Jun. 27, 2023

(54) RUBBER COMPOSITION FOR TIRE AND STUDLESS TIRE

(71) Applicant: The Yokohama Rubber Co., LTD., Tokyo (JP)

(72) Inventors: Hirokazu Kageyama, Hiratsuka (JP); Kazushi Kimura, Hiratsuka (JP); Satoshi Mihara, Hiratsuka (JP); Yutaro Yamamoto, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 277 days.

(21) Appl. No.: 17/040,487

(22) PCT Filed: Mar. 19, 2019

(86) PCT No.: PCT/JP2019/011423
§ 371 (c)(1),
(2) Date: Sep. 22, 2020

(87) PCT Pub. No.: WO2019/181930
PCT Pub. Date: Sep. 26, 2019

(65) Prior Publication Data
US 2021/0023880 A1    Jan. 28, 2021

(30) Foreign Application Priority Data
Mar. 22, 2018  (JP) .................................. 2018-054962

(51) Int. Cl.
*B60C 1/00* (2006.01)
*C08F 236/06* (2006.01)
(Continued)

(52) U.S. Cl.
CPC .............. *B60C 1/00* (2013.01); *C08F 236/06* (2013.01); *C08G 18/718* (2013.01);
(Continued)

(58) Field of Classification Search
CPC ...... B60C 1/00; C08F 236/06; C08F 2810/40; C08G 18/718; C08G 18/7621; C08K 5/20;
(Continued)

(56) References Cited

U.S. PATENT DOCUMENTS

2017/0183483 A1   6/2017 Kimura et al.
2018/0072860 A1   3/2018 Kimura et al.

FOREIGN PATENT DOCUMENTS

CA      2 218 756      *   6/2000
JP      2012-102288        5/2012
(Continued)

OTHER PUBLICATIONS

International Search Report for International Application No. PCT/JP2019/011423 dated May 14, 2019, 2 pages, Japan.

*Primary Examiner* — Doris L Lee
(74) *Attorney, Agent, or Firm* — Thorpe North & Western (57) ABSTRACT

A rubber composition for a tire according to an embodiment of the present technology includes: 100 parts by mass of a diene rubber and from 1 to 30 parts by mass of a thermally expandable microcapsule composite body, and the thermally expandable microcapsule composite body contains one or more thermally expandable microcapsules and an acrylonitrile butadiene copolymer and/or a crosslinked body thereof covering the one or more thermally expandable microcapsules.

13 Claims, 2 Drawing Sheets

(51) Int. Cl.
  *C08G 18/71* (2006.01)
  *C08G 18/76* (2006.01)
  *C08K 5/20* (2006.01)
  *C08K 7/16* (2006.01)
  *C08K 7/22* (2006.01)
  *C08L 9/02* (2006.01)
  *C08L 13/00* (2006.01)
  *C08L 57/00* (2006.01)

(52) U.S. Cl.
  CPC ............ *C08G 18/7621* (2013.01); *C08K 5/20* (2013.01); *C08K 7/16* (2013.01); *C08K 7/22* (2013.01); *C08L 9/02* (2013.01); *C08L 13/00* (2013.01); *C08L 57/00* (2013.01); *C08F 2810/40* (2013.01); *C08K 2201/005* (2013.01); *C08L 2205/22* (2013.01)

(58) Field of Classification Search
  CPC ...... C08K 7/16; C08K 7/22; C08K 2201/005; C08L 9/02; C08L 13/00; C08L 57/00; C08L 2205/22
  See application file for complete search history.

(56) References Cited

FOREIGN PATENT DOCUMENTS

| | | |
|---|---|---|
| JP | 2012-211316 | 11/2012 |
| JP | 2015-221854 | 12/2015 |
| JP | 2016-125000 | 7/2016 |
| JP | 2016-169278 | 9/2016 |
| WO | WO 2015/178485 | 11/2015 |
| WO | WO 2016/143852 | 9/2016 |

* cited by examiner

RUBBER COMPOSITION FOR TIRE AND STUDLESS TIRE

TECHNICAL FIELD

The present technology relates to a rubber composition for a tire and a studless tire.

BACKGROUND ART

Conventionally, a rubber composition for a tire containing thermally expandable microcapsules has been studied in order to improve the friction on ice of a studless tire.

For example, in the scope of the claims of Japan Unexamined Patent Publication No. 2016-169278, "a thermally expandable microcapsule composite body having a structure in which a plurality of thermally expandable microcapsules adhere on cellulose fibers" is disclosed. Japan Unexamined Patent Publication No. 2016-169278 describes that performance on ice of a studless tire is improved by blending the thermally expandable microcapsule composite body in a rubber composition.

Recently, with increase of a required safety level, there has been a demand for further improvements in performance on ice (breaking ability on ice) of a studless tire. There is also a demand for achieving wear resistance performance as well in a compatible manner.

In such circumstances, when the inventors of the present technology prepared and evaluated a rubber composition for a tire, in reference to the examples of Japan Unexamined Patent Publication No. 2016-169278, it became apparent that it is preferable to further improve the performance on ice and the wear resistance performance.

SUMMARY

The present technology provides: a rubber composition for a tire having excellent performance on ice and wear resistance performance; and a studless tire using the rubber composition for a tire.

As a result of diligent research on the above problems, the inventors of an embodiment of the present technology found that the problems described above can be solved by using a thermally expandable microcapsule composite body containing thermally expandable microcapsules and an acrylonitrile butadiene copolymer and/or a crosslinked body thereof, which covers the thermally expandable microcapsules, and thus completed an embodiment of the present technology.

Specifically, the inventors of the present technology found that the problems described above can be solved by the following features.

(1) A rubber composition for a tire, including:
100 parts by mass of a diene rubber; and from 1 to 30 parts by mass of a thermally expandable microcapsule composite body,
the thermally expandable microcapsule composite body containing one or more thermally expandable microcapsules and an acrylonitrile butadiene copolymer and/or a crosslinked body thereof covering the one or more thermally expandable microcapsules.

(2) The rubber composition for a tire according to (1) above, wherein the one or more thermally expandable microcapsules are a plurality of thermally expandable microcapsules.

(3) The rubber composition for a tire according to (2) above, wherein the plurality of thermally expandable microcapsules are connected in a linear, band-like, or tuft-like manner.

(4) The rubber composition for a tire according to any one of (1) to (3) above, wherein the thermally expandable microcapsule composite body contains the one or more thermally expandable microcapsules and the crosslinked body of the acrylonitrile butadiene copolymer covering the one or more thermally expandable microcapsules, and the crosslinked body is a crosslinked body of an acrylonitrile butadiene copolymer having a carboxy group or an amino group with an isocyanate.

(5) The rubber composition for a tire according to (4) above, wherein the isocyanate is at least one type of an isocyanate selected from the group consisting of an isocyanate silane, a diisocyanate, and a polyfunctional isocyanate.

(6) The rubber composition for a tire according to any one of (1) to (5) above, wherein the thermally expandable microcapsule composite body further contains a non-ionic surfactant, and
a content of the non-ionic surfactant is from 5 to 50 mass % relative to a content of the acrylonitrile butadiene copolymer and/or the crosslinked body thereof.

(7) The rubber composition for a tire according to any one of (1) to (6) above, further including a carbon black and/or a white filler.

(8) The rubber composition for a tire according to any one of (1) to (7) above, further including polymer microparticles having an average particle size from 1 to 200 μm and being three-dimensionally crosslinked, wherein a content of the polymer microparticles is from 1 to 30 parts by mass relative to 100 parts by mass of the diene rubber.

(9) The rubber composition for a tire according to any one of (1) to (8) above, wherein a content of the thermally expandable microcapsules contained in the thermally expandable microcapsule composite body is from 1 to 15 parts by mass relative to 100 parts by mass of the diene rubber.

(10) A studless tire, including a tire tread portion formed from the rubber composition for a tire according to any one of (1) to (9) above.

As described below, an embodiment of the present technology can provide a rubber composition for a tire having excellent performance on ice and wear resistance performance; and a studless tire using the rubber composition for a tire.

DETAILED DESCRIPTION

Hereinafter, a rubber composition for a tire and a studless tire using the rubber composition for a tire according to an embodiment of the present technology will be described.

In the present specification, a numerical range indicated using "(from) . . . to . . . " includes the former number as the lower limit value and the latter number as the upper limit value.

Furthermore, for each of the components contained in the rubber composition for a tire according to an embodiment of the present technology, one type may be used alone, or two or more types may be used in combination. Here, when two or more types for each of the components are used in combination, the content of the corresponding component refers to the total content unless otherwise specified.

Rubber Composition for a Tire

A rubber composition for a tire according to an embodiment of the present technology (hereinafter, also referred to as "composition according to an embodiment of the present technology") includes: 100 parts by mass of a diene rubber and 1 to 30 parts by mass of a thermally expandable microcapsule composite body.

Here, the thermally expandable microcapsule composite body contains one or more thermally expandable microcapsules and an acrylonitrile butadiene copolymer and/or a crosslinked body thereof that covers the one or more thermally expandable microcapsules.

It is thought that the composition according to an embodiment of the present technology can achieve the effects described above because of having such a configuration. Although the reason is not clear, it may be assumed to be as follows.

It is thought that since the composition according to an embodiment of the present technology includes thermally expandable microcapsules, the thermally expandable microcapsules absorb water on ice to increase frictional force to a road surface, and as a result, performance on ice is improved. Note that from the examination of the inventors of an embodiment of the present technology, it has been clear that when a plurality of thermally expandable microcapsules are connected, water is efficiently absorbed and thus the performance on ice is further improved.

Here, from the examination of the inventors of an embodiment of the present technology, it has become apparent that when thermally expandable microcapsules are simply blended into a rubber composition for a tire to produce a studless tire, wear may progress through the thermally expandable microcapsules as starting points due to friction between the studless tire and the road surface. On the other hand, it is thought that in the composition according to an embodiment of the present technology, the thermally expandable microcapsules are covered by an acrylonitrile butadiene copolymer and/or a crosslinked body thereof (coating layer), so that the coating layer absorbs stress and suppresses the progress of wear.

It is presumed that as a result, the composition according to an embodiment of the present technology exhibits excellent performance on ice and wear resistance performance.

Each of the components included in the composition according to an embodiment of the present technology will be described in detail below.

Diene Rubber

There is no particular restriction on a diene rubber included in the composition according to an embodiment of the present technology, and specific examples thereof include natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), butyl rubber (IIR), halogenated butyl rubber (Br-IIR, Cl-IIR), chloroprene rubber (CR), and a derivative of each of these rubbers. From the perspective of achieving superior effects of an embodiment of the present technology, the diene rubber preferably contains 30 mass % or greater of at least one type of these rubbers.

From the perspective of achieving superior effects of an embodiment of the present technology, the diene rubber described above preferably contains natural rubber (NR) or butadiene rubber (BR), more preferably. natural rubber (NR) and butadiene rubber (BR) and preferably contains from 30 to 70 mass % of the natural rubber (NR) and from 30 to 70 mass % of the butadiene rubber (BR), more preferably, 40 to 60 mass % of the natural rubber (NR) and from 40 to 60 mass % of the butadiene rubber (BR).

The weight average molecular weight (Mw) of the diene rubber is not particularly limited, but is preferably from 100000 to 10000000, more preferably from 200000 to 1500000, and even more preferably from 300000 to 3000000, from the perspective of achieving superior effects of an embodiment of the present technology.

Furthermore, the number average molecular weight (Mn) of the diene rubber is not particularly limited, but is preferably from 50000 to 5000000, more preferably from 100000 to 750000, and even more preferably from 150000 to 1500000, from the perspective of achieving superior effects of an embodiment of the present technology.

The Mw and/or Mn of at least one type of diene rubber contained in the diene rubber is preferably within the ranges described above, and the Mw and/or Mn of all types of diene rubber contained in the diene rubber are more preferably within the ranges described above.

Note that in the present specification, Mw and Mn each are a standard polystyrene conversion value obtained by gel permeation chromatography (GPC) measurement under the following conditions.

Solvent: Tetrahydrofuran
Detector: RI detector

Specific Composite Body

The thermally expandable microcapsule composite body included in the composition according to an embodiment of the present technology is a composite body (hereinafter, also referred to as "specific composite body") containing one or more thermally expandable microcapsules and an acrylonitrile butadiene copolymer and/or a crosslinked body thereof that covers the one or more thermally expandable microcapsules. That is, the specific composite body has a structure in which one or more thermally expandable microcapsules are covered by a coating layer that is an acrylonitrile butadiene copolymer and/or a crosslinked body thereof.

Figure 1:
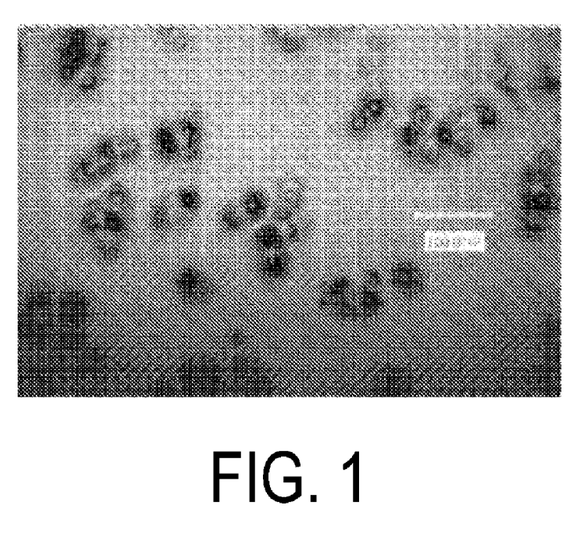
FIG. 1 is a microscope photograph of one embodiment of a specific composite body.

FIG. 1 illustrates a microscope photograph of one embodiment of the specific composite body. In FIG. 1, a plurality of thermally expandable microcapsules are mainly covered by a coating layer.

Thermally Expandable Microcapsule

The thermally expandable microcapsule includes a thermoplastic resin particle containing a substance that vaporizes or expands due to heat to generate a gas. Here, the thermally expandable microcapsule becomes a microcapsule in which a gas is sealed inside an outer shell formed from the thermoplastic resin by heating at a temperature (e.g., from 130 to 190° C.) that is equal to or higher than the initiation temperature of vaporization or expansion of the substance.

From the perspective of achieving superior effects of an embodiment of the present technology, the particle size of the thermally expandable microcapsule before expansion is preferably from 5 to 300 μm and more preferably from 10 to 200 μm.

As the thermoplastic resin, for example, a polymer of (meth)acrylonitrile and/or a copolymer having a high (meth)acrylonitrile content are suitably used. Monomers such as vinyl halide, vinylidene halide, styrene-based monomer, (meth)acrylate-based monomer, vinyl acetate, butadiene, vinylpyridine, and chloroprene are used, as other monomers (comonomers) in the case of a copolymer.

Note that the thermoplastic resin may be made crosslinkable using a crosslinking agent such as divinylbenzene, ethylene glycol di(meth)acrylate, triethylene glycol di(meth)acrylate, trimethylolpropane tri(meth)acrylate, 1,3-butylene glycol di(meth)acrylate, allyl(meth)acrylate, triacrylformal, and triallyl isocyanurate. For the crosslinked form, the thermoplastic resin is preferably uncrosslinked, but may be partially crosslinked to a degree that does not impair the properties as a thermoplastic resin.

Specific examples of the substance that generates a gas when vaporized or expanded due to heat, which is contained in the thermally expandable microcapsule, include: liquids such as hydrocarbons such as n-pentane, isopentane, neopentane, butane, isobutane, hexane, and petroleum ether; and chlorinated hydrocarbons such as methyl chloride, methylene chloride, dichloroethylene, trichloroethane, and trichloroethylene; or solids such as azodicarbonamide, dinitrosopentamethylenetetramine, azobisisobutyronitrile, toluenesulfonyl hydrazide derivatives, and aromatic succinyl hydrazide derivatives.

As such thermally expandable microcapsules, commercially available products may be used; for example, trade names "Expancel 091DU-80" and "Expancel 092DU-120", available from Expancel in Sweden, and trade names "Matsumoto Microsphere F-85", "Matsumoto Microsphere F-100", and "Matsumoto Microsphere F-100D", available from Matsumoto Yushi-Seiyaku Co., Ltd, are available.

As described above, the specific composite body has a structure in which one or more thermally expandable microcapsules are covered by a coating layer that is an acrylonitrile butadiene copolymer and/or a crosslinked body thereof. From the perspective of achieving superior effects of an embodiment of the present technology, the specific composite body preferably has a structure in which a plurality (two or more) of the thermally expandable microcapsules are covered by a coating layer that is an acrylonitrile butadiene copolymer and/or a crosslinked body thereof. The plurality of thermally expandable microcapsules are preferably connected in a linear, band-like, or tuft-like manner, from the perspective of achieving superior effects of an embodiment of the present technology.

In the composition according to an embodiment of the present technology, the content of the thermally expandable microcapsules contained in the specific composite body is not particularly limited, but from the perspective of achieving superior effects of an embodiment of the present technology, the content is preferably from 1 to 30 parts by mass, more preferably from 2 to 20 parts by mass, and even more preferably 3 to 10 parts by mass, relative to 100 parts by mass of the diene rubber described above.

Also, the proportion of the thermally expandable microcapsules in the specific composite body is not particularly limited, but from the perspective of achieving superior effects of an embodiment of the present technology, the proportion is preferably from 10 to 90 mass % and more preferably from 30 to 70 mass %.

Coating Layer

As described above, the specific composite body has a structure in which one or more thermally expandable microcapsules are covered by a coating layer that is an acrylonitrile butadiene copolymer and/or a crosslinked body thereof.

The coating layer is not particularly limited as long as the coating layer is an acrylonitrile butadiene copolymer and/or a crosslinked body thereof, but from the perspective of achieving superior effects of an embodiment of the present technology, the coating layer is preferably a crosslinked body of an acrylonitrile butadiene copolymer.

Note that in the present specification, the acrylonitrile butadiene copolymer and/or the crosslinked body thereof, which is a coating layer, is not included in the diene rubber described above.

In the above-mentioned acrylonitrile butadiene copolymer and/or crosslinked body thereof, the content of a repeating unit derived from acrylonitrile (acrylonitrile content) is not particularly limited, but from the perspective of achieving superior effects of an embodiment of the present technology, the content is preferably from 5 to 50 mass % and more preferably from 10 to 30 mass %.

From the perspective of achieving superior effects of an embodiment of the present technology, the coating layer preferably has a urethane bond (—NH—C(=O)—O—) or a urea bond (—NH—C(=O)—NH—) and more preferably has a urethane bond.

When the coating layer is a crosslinked body of an acrylonitrile butadiene copolymer, from the perspective of achieving superior effects of an embodiment of the present technology, the crosslinked body is preferably a crosslinked body of acrylonitrile butadiene copolymer having a carboxy group or an amino group with an isocyanate and is more preferably a crosslinked body of an acrylonitrile butadiene copolymer having a carboxy group with an isocyanate.

In the composition according to an embodiment of the present technology, the content of the coating layer is not particularly limited, but from the perspective of achieving superior effects of an embodiment of the present technology, the content is preferably from 1 to 30 parts by mass, more preferably from 2 to 20 parts by mass, and even more preferably from 3 to 10 parts by mass, relative to 100 parts by mass of the diene rubber described above.

The proportion of the coating layer in the specific composite body is not particularly limited, but from the perspective of achieving superior effects of an embodiment of the present technology, the proportion is preferably from 10 to 90 mass % and preferably from 30 to 70 mass %.

In addition, the proportion of the content of the coating layer relative to the content of the thermally expandable microcapsules in the specific composite body is not particularly limited, but from the perspective of achieving superior effects of an embodiment of the present technology, the proportion is preferably from 50 to 200 mass % and more preferably from 70 to 130 mass %.

Non-Ionic Surfactant

From the perspective of achieving superior effects of an embodiment of the present technology, the specific composite body preferably further includes a non-ionic surfactant.

The non-ionic surfactant is not particularly limited and specific examples thereof include: sorbitan fatty acid esters, polyoxyethylene sorbitan fatty acid, polyoxyethylene higher alcohol ethers, polyoxyethylene-propylene higher alcohol ethers, polyoxyethylene fatty acid esters, polyoxyethylene alkylphenols, polyoxyethylene aliphatic hydrocarbon amines (e.g. polyoxyethylene alkylamine and polyoxyethylene alkyleneamine), polyoxyethylene aliphatic hydrocarbon amides (e.g. polyoxyethylene alkylamide and polyoxyethylene alkyleneamide), and polyoxyethylene-polyoxypropylene block polymers.

From the perspective of achieving superior effects of an embodiment of the present technology, the non-ionic surfactant preferably has an amide group or an amino group and more preferably has an amide group.

The content of the non-ionic surfactant is not particularly limited, but from the perspective of achieving effects of an embodiment of the present technology, is preferably from 0.1 to 10 parts by mass, more preferably from 0.2 to 5 parts by mass, and even more preferably from 0.3 to 2 parts by mass, relative to 100 parts by mass of the diene rubber described above.

In addition, the proportion of the non-ionic surfactant in the specific composite body is not particularly limited, but from the perspective of achieving superior effects of an embodiment of the present technology, the proportion is preferably from 1 to 20 mass % and preferably from 5 to 10 mass %.

In addition, in the specific composite body, the proportion of the content of the non-ionic surfactant relative to the content of the coating layer described above in the specific composite is not particularly limited, but from the perspective of achieving superior effects of an embodiment of the present technology, the proportion is preferably from 5 to 50 mass % and more preferably from 10 to 30 mass %.

Method of Producing Specific Composite Body

The method of producing a specific composite body is not particularly limited, and examples thereof include a method of mixing a thermally expandable microcapsule and an acrylonitrile butadiene copolymer.

When the coating layer of the specific composite body is a crosslinked body of an acrylonitrile butadiene copolymer, from the perspective of achieving superior performance on ice and wear resistance performance of an obtained composition according to an embodiment of the present technology, the method of producing a specific composite body is preferably a method in which a specific composite body is obtained by crosslinking an acrylonitrile butadiene copolymer in a liquid polymer containing thermally expandable microcapsules (hereinafter, also referred to as "method 1 according to an embodiment of the present technology"). Among these, from the perspective of achieving superior performance on ice and wear resistance performance of the obtained composition according to an embodiment of the present technology, a method in which a specific composite body is obtained by reacting an acrylonitrile butadiene copolymer having a carboxy group or an amino group with an isocyanate in a liquid polymer containing thermally expandable microcapsules (hereinafter, also referred to as "method 2 according to an embodiment of the present technology") is more preferable. Furthermore, in the methods 1 and 2 according to an embodiment of the present technology, from the perspective of achieving superior performance on ice and wear resistance performance of the obtained composition according to an embodiment of the present technology, it is preferable to blend the non-ionic surfactant in the liquid polymer.

Hereinafter, "superior performance on ice and wear resistance performance of the obtained composition according to an embodiment of the present technology" is also simply referred to as "superior effects of an embodiment of the present technology".

It is thought that when a crosslinked body is formed in a liquid polymer, the crosslinked body (coating layer) is formed to cover a plurality of thermally expandable microcapsules by phase separation between the liquid polymer and the crosslinked body, and the plurality of thermally expandable microcapsules are connected in a linear, band-like, or tuft-like manner in the coating layer. As a result, it is thought that the obtained composition according to an embodiment of the present technology exhibits superior performance on ice and wear resistance performance.

Each of the components used in the methods 1 and 2 according to an embodiment of the present technology are described below.

Thermally Expandable Microcapsule

The thermally expandable microcapsule is as described above.

Liquid Polymer

The liquid polymer is not particularly limited, but specific examples include liquid polybutadiene, liquid polystyrenebutadiene, and liquid polyisoprene. Among these, from the perspective of achieving superior effects of an embodiment of the present technology, liquid polybutadiene is preferable.

From the perspective of achieving superior effects of an embodiment of the present technology, the number average molecular weight (Mn) of the liquid polymer is preferably 1000 or more and less than 50000, more preferably from 5000 to 40000, even more preferably from 6000 to 30000, and particularly preferably from 7000 to 20000.

Acrylonitrile Butadiene Copolymer Having a Carboxy Group or Amino Group

The acrylonitrile butadiene copolymer having a carboxy group or an amino group is not particularly limited, but from the perspective of achieving superior effects of an embodiment of the present technology, an acrylonitrile butadiene copolymer having a carboxy group or an amino group at the terminal is preferable. Note that a urethane bond is formed by reaction of the acrylonitrile butadiene copolymer having a carboxy group with an isocyanate, and a urea bond is formed by reaction of the acrylonitrile butadiene copolymer having an amino group with an isocyanate.

The content of acrylonitrile of the acrylonitrile butadiene copolymer having a carboxy group or an amino group (acrylonitrile content) is not particularly limited, but from the perspective of achieving superior effects of an embodiment of the present technology, the content is preferably from 5 to 50 mass %, more preferably from 10 to 30 mass %, and even more preferably from 17 to 25 mass %.

From the perspective of achieving superior effects of an embodiment of the present technology, the molecular weight of the acrylonitrile butadiene copolymer having a carboxy group or an amino group is preferably from 1000 to 50000, more preferably from 2000 to 10000, and even more preferably from 3000 to 5000.

Isocyanate

The isocyanate is not particularly limited, and specific examples thereof include: an isocyanate silane, a diisocyanate, and a polyfunctional isocyanate. From the perspective of achieving superior effects of an embodiment of the present technology, the isocyanate is preferably a polyfunctional isocyanate (an isocyanate having two or more isocyanate groups).

Specific examples of the polyfunctional isocyanate include: aromatic polyisocyanates, such as tolylene diisocyanate, diphenylmethane diisocyanate, phenylene diisocyanate, polymethylene polyphenylene polyisocyanate, xylylene diisocyanate, tetramethylxylylene diisocyanate, tolidine diisocyanate, 1,5-naphthalene diisocyanate, and triphenylmethane triisocyanate; aliphatic polyisocyanates, such as hexamethylene diisocyanate, trimethylhexamethylene diisocyanate, lysine diisocyanate, norbornane diisocyanate, transcyclohexane-1,4-diisocyanate, isophorone diisocyanate, bis(isocyanate methyl)cyclohexane, and dicyclohexylmethane diisocyanate; and an isocyanurate form, a biuret form, and an adduct form of these.

Non-Ionic Surfactant

The non-ionic surfactant is as described above.

Content

In the composition according to an embodiment of the present technology, the content of the specific composite body is from 1 to 30 parts by mass relative to 100 parts by mass of the diene rubber described above. Among these, from the perspective of achieving superior effects of an embodiment of the present technology, the content is preferably from 5 to 20 parts by mass.

Optional Component

The composition according to an embodiment of the present technology may contain a component (optional component) other than the components described above, as necessary.

Examples of the optional component include various additives that are typically used in rubber compositions, such as carbon black, white fillers (preferably silica), silane coupling agents, terpene resins (preferably aromatic-modified terpene resins), thermally expandable microcapsules, zinc oxide (flower of zinc), stearic acid, anti-aging agents, waxes, processing aids, process oils, liquid polymers, thermosetting resins, vulcanizing agents (e.g., sulfur), and vulcanization accelerators.

Carbon Black and/or White Filler

The composition according to an embodiment of the present technology preferably contains carbon black and/or a white filler and more preferably contains both carbon black and white filler.

Carbon Black

The carbon black is not particularly limited, and for example, carbon blacks of various grades, such as SAF-HS (Super Abrasion Furnace-High Structure), SAF (Super Abrasion Furnace), ISAF-HS (Intermediate Super Abrasion Furnace-High Structure), ISAF (Intermediate Super Abrasion Furnace), ISAF-LS (Intermediate Super Abrasion Furnace-Low Structure), IISAF-HS (Intermediate Intermediate Super Abrasion Furnace-High Structure), HAF-HS (High Abrasion Furnace-High Structure), HAF (High Abrasion Furnace), HAF-LS (High Abrasion Furnace-Low Structure), FEF (Fast Extruding Furnace), GPF (General Purpose Furnace), and SRF (Semi-Reinforcing Furnace), can be used.

The nitrogen adsorption specific surface area ($N_2SA$) of the carbon black is not particularly limited, but is preferably from 50 to 200 $m^2/g$ and more preferably from 70 to 150 $m^2/g$, from the perspective of achieving superior effects of an embodiment of the present technology.

Note that the nitrogen adsorption specific surface area ($N_2SA$) is a value of the amount of nitrogen adsorbed to the surface of carbon black, measured in accordance with JIS (Japanese Industrial Standard) K6217-2:2001 "Part 2: Determination of specific surface area—Nitrogen adsorption methods—Single-point procedures".

White Filler

The white filler is not particularly limited, and examples thereof include: silica, calcium carbonate, magnesium carbonate, talc, clay, alumina, aluminum hydroxide, titanium oxide, and calcium sulfate. Among these, from the perspective of achieving superior effects of an embodiment of the present technology, the white filler is preferably silica.

The silica is not particularly limited, and examples thereof include: wet silica (hydrous silicic acid), dry silica (silicic anhydride), calcium silicate, and aluminum silicate. Among these, from the perspective of achieving superior effects of an embodiment of the present technology, the silica is preferably wet silica.

The cetyltrimethylammonium bromide (CTAB) adsorption specific surface area of the silica is not particularly limited, but is preferably from 100 to 400 $m^2/g$, more preferably from 150 to 300 $m^2/g$, and even more preferably from 160 to 250 $m^2/g$, from the perspective of achieving superior effects of an embodiment of the present technology.

Note that the CTAB adsorption specific surface area is a value of the amount of CTAB adsorbed to the surface of silica measured in accordance with JIS K6217-3:2001 "Part 3: Determination of specific surface area—CTAB adsorption method."

In the composition according to an embodiment of the present technology, from the perspective of achieving superior effects of an embodiment of the present technology, the content of the carbon black and/or the white filler (particularly silica) (total content when the carbon black and the white filler are used in combination) is preferably from 30 to 100 parts by mass, more preferably from 40 to 90 parts by mass, and more preferably from 45 to 80 parts by mass, relative to 100 parts by mass of the diene rubber described above.

Furthermore, in the composition according to an embodiment of the present technology, from the perspective of achieving superior effects of an embodiment of the present technology, the content of the carbon black is preferably from 10 to 50 parts by mass, more preferably from 15 to 45 parts by mass, and more preferably from 20 to 40 parts by mass, relative to 100 parts by mass of the diene rubber.

Furthermore, in the composition according to an embodiment of the present technology, from the perspective of achieving superior effects of an embodiment of the present technology, the content of the white filler (particularly silica) is preferably from 10 to 80 parts by mass, more preferably from 15 to 60 parts by mass, and more preferably from 20 to 50 parts by mass, relative to 100 parts by mass of the diene rubber described above.

Specific Microparticle

From the perspective of achieving superior effects of an embodiment of the present technology, the composition according to an embodiment of the present technology preferably contains polymer microparticles having an average particle size from 1 to 200 um and being three-dimensionally cross-linked (also referred to as "specific microparticles" hereafter).

From the perspective of achieving superior effects of an embodiment of the present technology, the average particle size of the specific microparticles is preferably from 1 to 50 um and more preferably from 6 to 40 μm.

Herein, the average particle size refers to an average value of equivalent circle diameters measured by using a laser microscope.

Specific examples of polymers constituting the specific microparticles include: a polyether-based, polyester-based, polyolefin-based, polycarbonate-based, aliphatic-based, saturated hydrocarbon-based, acrylic-based, or plant-derived polymer or copolymer.

Examples of the polyether-based polymer or copolymer include: polyethylene glycol, polypropylene glycol (PPG), polypropylene triol, ethylene oxide/propylene oxide copolymers, polytetramethylene ether glycol (PTMEG), and sorbitol-based polyol.

Furthermore, examples of the polyester-based polymer or copolymer include: condensation products of low molecular weight polyhydric alcohols (e.g., ethylene glycol, diethylene glycol, propylene glycol, and the like) with polybasic carboxylic acids (e.g., adipic acid, sebacic acid, terephthalic acid, isophthalic acid, and the like) (condensed polyester polyol); and lactone-based polyols.

Furthermore, examples of the polyolefin-based polymer or copolymer include: polyethylene, polypropylene, ethylene propylene copolymers (EPR, EPDM), polybutylene, polyisobutylene, and hydrogenated polybutadiene.

Furthermore, examples of the polycarbonate-based polymer or copolymer include: substances obtained by transesterification reaction of polyol compounds (e.g., 1,6-hexanediol, 1,4-butanediol, 1,5-pentanediol, and the like) with dialkyl carbonates.

Furthermore, examples of the acrylic-based polymer or copolymer include: acrylic polyols; homopolymers of acrylates such as acrylate, methyl acrylate, ethyl acrylate, butyl acrylate, and 2-ethylhexyl acrylate; and acrylate copolymers formed by combining two or more types of these acrylates.

Examples of the plant-derived polymer or copolymer include: polyglycolic acid, polylactic acid, polybutylene succinate, and polytrimethylene terephthalate.

Among these, from the perspective of achieving superior effects of an embodiment of the present technology, the polymer constituting the specific microparticles is preferably a polyether-based polymer or copolymer and more preferably polypropylene glycol.

The specific microparticles preferably have siloxane bonds from the perspective of achieving superior effects of an embodiment of the present technology.

Method of Producing Specific Microparticles

The method of producing specific microparticles is not particularly limited, but from the perspective of achieving superior effects of an embodiment of the present technology, a method in which specific microparticles are obtained by crosslinking a polymer (for example, the polymer described above) with a crosslinking agent or the like in a liquid polymer is preferable, and a method in which specific microparticles are obtained by reacting polymers with each other (preferably polyether-based polymers or copolymers and more preferably polypropylene glycol) each having a hydrolyzable silyl group (preferably an alkoxysilyl group) at the terminal in a liquid polymer is more preferable. When the hydrolyzable silyl groups are made to react with each other, a condensation catalyst is preferably used from the perspective of achieving superior effects of an embodiment of the present technology. Specific examples of the condensation catalyst include: dibutyltin dilaurate, dibutyltin dioleate, dibutyltin diacetate, tetrabutyl titanate, tin (I) octanoate, and octyltin compounds.

Polymer microparticles dispersed in the liquid polymer can be obtained by crosslinking the polymer in the liquid polymer. The liquid polymer is the same as the liquid polymer described in the specific composite body described above.

The average particle size of the specific microparticles can be controlled by the molecular weight of the polymer before crosslinking, the amount ratio of the liquid polymer to the polymer, the reaction temperature, and the like.

For another aspect of the specific microparticles, for example, those described in paragraphs [0038] to [0055] of Japan Unexamined Patent Publication No. 2012-211316 can be appropriately adopted, the contents of which are incorporated herein by reference.

Content

In the composition according to an embodiment of the present technology, the content of the specific microparticles is not particularly limited, but from the perspective of achieving superior effects of an embodiment of the present technology, the content is preferably from 1 to 30 parts by mass and more preferably from 2 to 10 parts by mass, relative to 100 parts by mass of the diene rubber described above.

Method of Preparing Rubber Composition for a Tire

The method of producing the composition according to an embodiment of the present technology is not particularly limited, and specific examples thereof include a method whereby each of the above-mentioned components is kneaded using a publicly known method and device (e.g. Banbury mixer, kneader, and roll). When the composition according to an embodiment of the present technology contains sulfur or a vulcanization accelerator, components other than the sulfur and the vulcanization accelerator are preferably mixed first at a high temperature (preferably from 100 to 160° C.) and then cooled before the sulfur or the vulcanization accelerator is mixed.

In addition, the composition according to an embodiment of the present technology can be vulcanized or crosslinked under conventional, publicly known vulcanizing or crosslinking conditions.

Studless Tire

The studless tire according to an embodiment of the present technology is a studless tire produced using the composition according to an embodiment of the present technology described above. Among these, the studless tire according to an embodiment of the present technology is preferably a studless tire that includes a tire tread portion produced using the composition according to an embodiment of the present technology.

Figure 2:
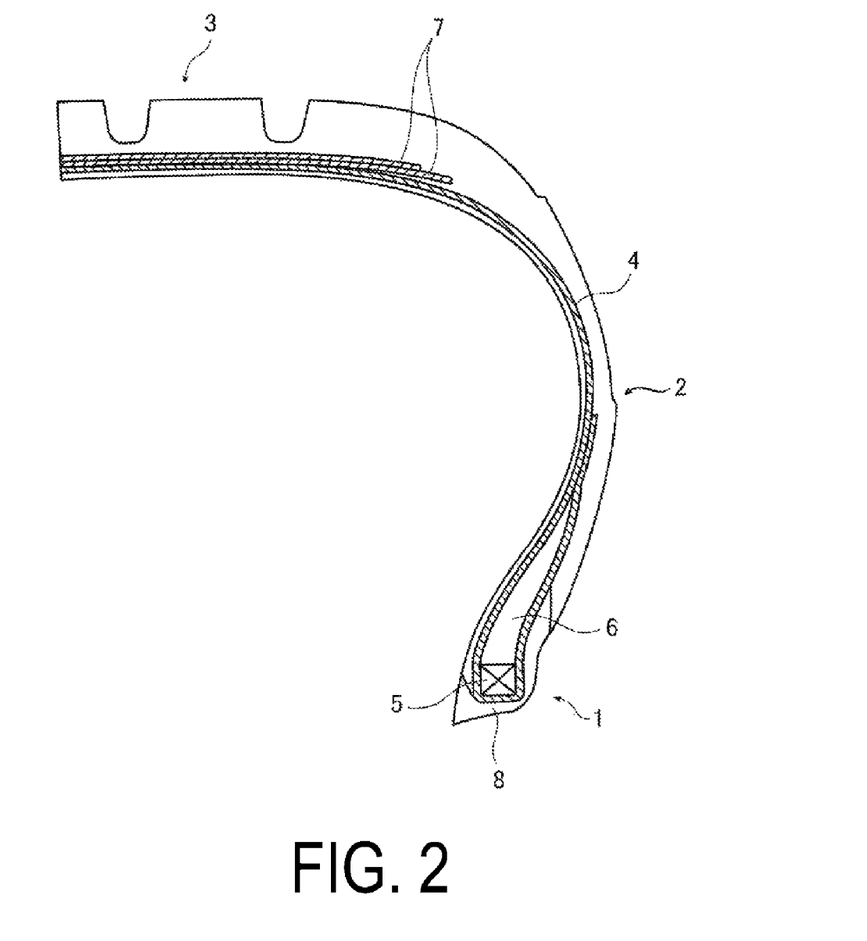
FIG. 2 is a partial cross-sectional schematic view of a studless tire according to an embodiment of the present technology.

FIG. 2 illustrates a partial cross-sectional schematic view of a studless tire that represents a studless tire according to an embodiment of the present technology, but the studless tire according to an embodiment of the present technology is not limited to the embodiment illustrated in FIG. 2.

In FIG. 2, reference sign 1 denotes a bead portion, reference sign 2 denotes a sidewall portion, and reference sign 3 denotes a tire tread portion. In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire circumference of the tire on the outer side of the carcass layer 4.

Additionally, a rim cushion 8 is provided in a portion of each of the bead portions 1 that is in contact with a rim.

Note that the tire tread portion 3 is formed from the composition according to an embodiment of the present technology described above. The studless tire according to an embodiment of the present technology can be produced, for example, in accordance with a known method. In addition to ordinary air or air with an adjusted oxygen partial pressure, inert gases such as nitrogen, argon, and helium can be used as the gas with which the studless tire according to an embodiment of the present technology is filled.

EXAMPLE

An embodiment of the present technology is described in further detail below by using examples. However, an embodiment of the present technology is not limited to these examples.

Production of Thermally Expandable Microcapsule Composite Body

A comparative composite body and specific composite bodies 1 to 4 were produced as follows.

Comparative Composite Body

In 120 g of water, 1.2 g of polyacrylic acid was dissolved, 80 g of a substance containing 15% cellulose microfibrils: CELISH KY110N (available from Daicel Fine Chem Ltd.) was added thereto, and the mixture was stirred for 5 minutes using an agitator equipped with a dissolver (rpm: 600 rpm). Next, 5 g of 2,2,2-nitrilotriethanol was added and further stirred under the same conditions for 5 minutes, then, the mixture was transferred from the agitator equipped with a dissolver to a butterfly agitator, 80 g of thermally expandable microcapsules: Matsumoto Microsphere F (available from Matsumoto Yushi-Seiyaku Co., Ltd.) was added thereto, and the mixture was stirred for 2 minutes at a rotation speed of 36 rpm. The obtained liquid product was spray-dried using a spray dryer at a hot air temperature of 90° C. to obtain white powder. When the obtained white powder was analyzed, it was confirmed that the white powder is a thermally expandable microcapsule composite body (designated as a comparative composite body) in which a plurality of thermally expandable microcapsules were connected to each other in a linear, band-like, or tuft-like manner and adhere on the cellulose fibers.

Specific Composite Body 1

100 g of an acrylonitrile butadiene copolymer having a carboxy group at a terminal (trade name: CTBN 1300×8, molecular weight: 3550, acrylonitrile content: 18 mass %, available from BTI Japan Inc.), 9 g of xylylene diisocyanate (XDI) (trade name: TAKENATE 500, available from Mitsui Chemicals, Inc.), 2 g of isocyanate silane (trade name: Y5187, available from Momentive Performance Materials Inc.) (the following structure), 30 g of a non-ionic surfactant (polyoxyethylene oleylamide) (trade name: LIPOMID O/15, available from Lion Specialty Chemicals Co., Ltd.), and 100 g of thermally expandable microcapsules (Matsumoto Microsphere F, available from Matsumoto Yushi-Seiyaku Co., Ltd.) were mixed. Subsequently, 50 g of liquid polybutadiene (trade name: L-BR-307 CN, number average molecular weight: 8000, available from Kuraray Co., Ltd.) was additionally mixed, and the mixture was warmed to 60° C. and left for 1 hour. In this way, a thermally expandable microcapsule composite body, dispersed in the liquid polybutadiene, (designated as a specific composite body 1) including: a plurality of thermally expandable microcapsules and a crosslinked body (coating layer) of an acrylonitrile butadiene copolymer covering the thermally expandable microcapsules was obtained. Note that the coating layer is a crosslinked body of an acrylonitrile butadiene copolymer (a reaction product of an acrylonitrile butadiene copolymer having a carboxy group at a terminal, xylylene diisocyanate, and isocyanate silane) and has a urethane bond. Also, when the specific composite body 1 was analyzed, the plurality of thermally expandable microcapsules were connected in a linear, band-like, or tuft-like manner.

Isocyanate Silane

O=C=NCH$_2$CH$_2$CH$_2$Si(OCH)$_3$

Specific Composite Body 2

A thermally expandable microcapsule composite body, dispersed in a liquid polybutadiene, (designated as a specific composite body 2) including: a plurality of thermally expandable microcapsules and a crosslinked body (coating layer) of an acrylonitrile butadiene copolymer covering the thermally expandable microcapsules was obtained in accordance with the same procedure as that of the specific composite body 1, except that instead of 100 g of an acrylonitrile butadiene copolymer having a carboxy group at a terminal (trade name: CTBN 1300×8, molecular weight: 3550, acrylonitrile content: 18 mass %, available from BTI Japan Inc.), 100 g of an acrylonitrile butadiene copolymer having a carboxy group at a terminal (trade name: CTBN 1300×13NA, molecular weight: 3150, acrylonitrile content: 16 mass %, available from BTI Japan Inc.) was used, and except that instead of 9 g of xylylene diisocyanate (XDI) (trade name: TAKENATE 500, available from Mitsui Chemicals, Inc.), 7.5 g of xylylene diisocyanate (XDI) (trade name: TAKENATE 500, available from Mitsui Chemicals, Inc.) was used. Note that the coating layer is a crosslinked body of an acrylonitrile butadiene copolymer (a reaction product of an acrylonitrile butadiene copolymer having a carboxy group at a terminal, xylylene diisocyanate, and isocyanate silane) and has a urethane bond. Also, when the specific composite body 2 was analyzed, the plurality of thermally expandable microcapsules were connected in a linear, band-like, or tuft-like manner.

Specific Composite Body 3

100 g of an acrylonitrile butadiene copolymer having an amino group at a terminal (trade name: ATBN 1300×16, molecular weight: 3800, acrylonitrile content: 18 mass %, available from BTI Japan Inc.), 50 g of liquid polybutadiene (product name: L-BR-307 CN, available from Kuraray Co., Ltd.), 30 g of a non-ionic surfactant (polyoxyethylene oleylamide) (trade name: LIPOMID O/15, available from Lion Specialty Chemicals Co., Ltd.), and 100 g of thermally expandable microcapsules (Matsumoto Microsphere F, available from Matsumoto Yushi-Seiyaku Co., Ltd.) were mixed. Subsequently, while stirring the mixture, a mixture of 8 g of xylylene diisocyanate (XDI) (trade name: TAKENATE 500, available from Mitsui Chemicals, Inc.) and 2 g of isocyanate silane (trade name: Y5187, available from Momentive Performance Materials Inc.) was gradually added over approximately 5 minutes and left at room temperature for 1 hour. In this way, a thermally expandable microcapsule composite body, dispersed in the liquid polybutadiene, (designated as a specific composite body 3) including: a plurality of thermally expandable microcapsules and a crosslinked body (coating layer) of an acrylonitrile butadiene copolymer covering the thermally expandable microcapsules. Note that the coating layer is a crosslinked body of an acrylonitrile butadiene copolymer (a reaction product of an acrylonitrile butadiene copolymer having an amino group at a terminal, xylylene diisocyanate, and isocyanate silane) and has a urea bond. Also, when the specific composite body 3 was analyzed, the plurality of thermally expandable microcapsules were connected in a linear, band-like, or tuft-like manner.

Specific Composite Body 4

A thermally expandable microcapsule composite body, dispersed in a liquid polybutadiene, (designated as a specific composite body 4) including: a plurality of thermally expandable microcapsules and a crosslinked body (coating layer) of an acrylonitrile butadiene copolymer covering the thermally expandable microcapsules was obtained in accordance with the same procedure as that of the specific composite body 1, except that instead of 30 g of polyoxyethylene oleylamide (trade name: LIPOMID O/15, available from Lion Specialty Chemicals Co., Ltd.), 30 g of polyoxyethylene oleylamine (trade name: LIPONOL O/25, available from Lion Specialty Chemicals Co., Ltd.) was used. Note that the coating layer is a crosslinked body of an acrylonitrile butadiene copolymer (a reaction product of an acrylonitrile butadiene copolymer having a carboxy group at a terminal, xylylene diisocyanate, and isocyanate silane) and has a urethane bond. Also, when the specific composite body 4 was analyzed, the plurality of thermally expandable microcapsules were connected in a linear, band-like, or tuft-like manner.

Production of Polymer Microparticle 1

To 100 g of hydrolyzable silyl-terminated polypropylene glycol (S-2410, available from AGC Inc.), 75 g of process oil (Diana Process Oil PS-32, available from Idemitsu Kosan Co., Ltd.), 75 g of liquid polyisoprene (LIR30, number average molecular weight: 28000, available from Kuraray Co., Ltd.), 0.3 g of distilled water, 5.0 of polyoxyethylene sorbitan tristearate (Rheodol TW-0320V, available from Kao Corporation), and 1 g of an octyltin compound (NEOSTANN S-1, available from Nitto Kasei Co., Ltd.) were added, and the mixture was stirred for 3 hours at 80° C. to prepare a slightly turbid paste-like product. When the obtained paste-like product was observed using a laser microscope VK-8710 (available from Keyence Corporation), it was confirmed that the obtained paste-like product was three-dimensionally crosslinked polymer microparticles having an average particle size of from 10 to 30 μm (skeleton: polyoxypropylene (polypropylene glycol), cross-link: siloxane bonds) (designated as polymer microparticles 1). Furthermore, as a result of subjecting this image to image processing and 3D profiling, the content (mass %) of the polymer microparticles 1 in the paste-like product was approximately 33%.

Preparation of Rubber Composition for a Tire

The components shown in Table 1 below were blended at proportions (parts by mass) shown in the table. Specifically, components except for sulfur and a vulcanization accelerator were first kneaded for 5 minutes in a 1.7-L sealed mixer and then discharged when the temperature reached 150° C. to obtain a master batch. Next, the sulfur and the vulcanization accelerator were kneaded with the obtained master batch using an open roll to obtain a rubber composition for a tire.

Note that in the rows of specific composite bodies in Table 1 below, numbers in parentheses represent, from the left in this order, parts by mass of the thermally expandable microcapsules, parts by mass of the crosslinked body (coating layer) of the acrylonitrile butadiene copolymer, parts by mass of the non-ionic surfactant included in the specific composite bodies, and parts by mass of the liquid polybutadiene. For example, in the case of the specific composite body 1, of the specific composite body 1 (15 parts by mass), the net parts by mass of the specific composite body 1 is 12 parts by mass (5 parts by mass of thermally expandable microcapsules+6 parts by mass of coating layer+1 part by mass of non-ionic surfactant), and the remaining 3 parts by mass are liquid polybutadiene. Furthermore, in the row of the comparative composite body in Table 1 below, numbers in parentheses represent, from the left in this order, parts by mass of the thermally expandable microcapsules and the total parts by mass of cellulose fibers and polyacrylic acid. Furthermore, in the row of the polymer microparticles 1 in Table 1 below, numbers in parentheses represent the net parts by mass of the polymer microparticles.

Production of Vulcanized Rubber Sheet

A vulcanized rubber sheet was produced by vulcanizing (for 15 minutes at 170° C.) the obtained rubber composition for a tire in a mold for Lambourn abrasion (disk having a diameter of 63.5 mm and a thickness of 5 mm).

Evaluation

The following evaluations were performed for the obtained vulcanized rubber sheet.

Performance on Ice

The obtained vulcanized rubber sheet was attached to a flat cylindrical rubber base, and a coefficient of friction on ice was measured using an inside drum on-ice friction tester. The measurement temperature was −1.5° C., the load was 5.5 g/cm$^3$, and the drum rotation speed was 25 km/hr.

The results are shown in Table 1. The results are expressed as index values with Comparative Example 1 being assigned the index value of 100. The larger the index value, the greater the frictional force on ice, indicating excellent performance on ice. In practical use, the index is preferably 108 or greater.

Wear Resistance Performance

For the obtained vulcanized rubber sheet, an amount of wear was measured in accordance with JIS K6264-1, 2:2005, using a Lambourn abrasion tester (available from Iwamoto Seisakusho Co. Ltd.) at a temperature of 20° C. and at a slip ratio of 50%. The index was then calculated from the following formula.

The results are shown in Table 1. The larger the index value, the smaller the amount of wear, indicating excellent wear resistance performance. In practical use, the index is preferably 105 or greater.

Index=(amount of wear of Comparative Example 1/amount of wear of each vulcanized rubber sheet)×100

TABLE 1

|  | Comparative Example 1 | Comparative Example 2 | Comparative Example 3 |
| --- | --- | --- | --- |
| NR | 50 | 50 | 50 |
| BR | 50 | 50 | 50 |
| Carbon black | 35 | 35 | 35 |
| Silica | 25 | 25 | 25 |
| Thermally expandable microcapsule | 5 | 5 |  |
| Comparative composite body |  |  | 10 (5/5) |
| Specific composite body 1 |  |  |  |
| Specific composite body 2 |  |  |  |
| Specific composite body 3 |  |  |  |
| Specific composite body 4 |  |  |  |
| Polymer microparticles 1 |  | 15 (5) |  |
| Zinc oxide | 4 | 4 | 4 |
| Stearic acid | 2 | 2 | 2 |
| Anti-aging agent | 2 | 2 | 2 |
| Wax | 2 | 2 | 2 |
| Oil | 20 | 15 | 20 |
| Sulfur | 1.5 | 1.5 | 1.5 |
| Vulcanization accelerator | 1.5 | 1.5 | 1.5 |
| Performance on ice | 100 | 105 | 106 |
| Wear resistance performance | 100 | 98 | 95 |

TABLE 1-continued

| | Example 1 | Example 2 | Example 3 | Example 4 | Example 5 |
|---|---|---|---|---|---|
| NR | 50 | 50 | 50 | 50 | 50 |
| BR | 50 | 50 | 50 | 50 | 50 |
| Carbon black | 35 | 35 | 35 | 35 | 35 |
| Silica | 25 | 25 | 25 | 25 | 25 |
| Thermally expandable microcapsule | | | | | |
| Comparative composite body | | | | | |
| Specific composite body 1 | 15 (5/6/1/3) | | | | 15 (5/6/1/3) |
| Specific composite body 2 | | 15 (5/6/1/3) | | | |
| Specific composite body 3 | | | 15 (5/6/1/3) | | |
| Specific composite body 4 | | | | 15 (5/6/1/3) | |
| Polymer microparticles 1 | | | | | 15 (5) |
| Zinc oxide | 4 | 4 | 4 | 4 | 4 |
| Stearic acid | 2 | 2 | 2 | 2 | 2 |
| Anti-aging agent | 2 | 2 | 2 | 2 | 2 |
| Wax | 2 | 2 | 2 | 2 | 2 |
| Oil | 15 | 15 | 15 | 15 | 15 |
| Sulfur | 1.5 | 1.5 | 1.5 | 1.5 | 1.5 |
| Vulcanization accelerator | 1.5 | 1.5 | 1.5 | 1.5 | 1.5 |
| Performance on ice | 112 | 108 | 110 | 109 | 115 |
| Wear resistance performance | 105 | 106 | 106 | 105 | 106 |

The details of each of the components shown in above Table 1 are as follows.

Note that the specific composite bodies 1 to 4 each are a thermally expandable microcapsule composite body including one or more thermally expandable microcapsules and a crosslinked body of an acrylonitrile butadiene copolymer covering the thermally expandable microcapsules and thus correspond to the specific composite body described above. On the other hand, the comparative composite body does not correspond to the specific composite body described above because the thermally expandable microcapsule composite body is not covered by the acrylonitrile butadiene copolymer and/or the crosslinked body thereof.

Furthermore, the polymer microparticles 1 are three-dimensionally crosslinked polymer microparticles having an average particle size of from 1 to 200 μm and thus correspond to the specific microparticles described above.

Furthermore, both NR and BR have a number average molecular weight of not less than 50000.

NR: Natural rubber (STR 20, available from Von Bundit Co., Ltd.; glass transition temperature: −65° C.)

BR: Butadiene rubber (Nipol BR1220, glass transition temperature: −110° C., available from ZEON CORPORATION)

Carbon black: Show Black N339 ($N_2SA$: 88 m²/g, available from Cabot Japan K.K.)

Silica: ULTRASIL VN3 (available from Evonik Degussa)

Thermally expandable microcapsules: Matsumoto Microsphere F (available from Matsumoto Yushi-Seiyaku Co., Ltd.)

Comparative composite body: Comparative composite body produced as described above Specific composite bodies 1 to 4: Specific composite bodies 1 to 4 produced as described above (including liquid polybutadiene)

Polymeric microparticles 1: Paste-like product including polymer microparticles 1 produced as described above Zinc oxide: Zinc Oxide III (available from Seido Chemical Industry Co., Ltd.)

Stearic acid: Beads stearic acid YR (available from Nippon Oil & Fats Co., Ltd.)

Anti-aging agent: Amine-based anti-aging agent (Santflex 6PPD, available from Flexsys)

Wax: Paraffin wax (available from Ouchi Shinko Chemical Industrial Co., Ltd.)

Oil: Aroma oil (Extract 4S, available from Showa Shell Sekiyu K.K.)

Sulfur: 5% Oil-treated sulfur (available from Hosoi Chemical Industry Co., Ltd.)

Vulcanization accelerator: Sulfenamide-based vulcanization accelerator (Sanceller CM-G, available from Sanshin Chemical Industry Co., Ltd.)

As can be seen from Table 1, Examples 1 to 5 each containing a specific composite body exhibited excellent performance on ice and wear resistance performance. Among these, Example 5 further containing specific microparticles exhibited more excellent performance on ice.

From the comparison between Examples 1 and 4 (comparison between aspects in which only the type of non-ionic surfactants included in the specific composite bodies was different), Example 1, in which the non-ionic surfactant is a non-ionic surfactant having an amide group, exhibited even more excellent performance on ice.

From the comparison among Examples 1 to 3 (comparison among aspects in which the specific composite bodies each contained a non-ionic surfactant having an amide group), Example 1, in which the coating layer of the specific composite body was a crosslinked body of an acrylonitrile butadiene copolymer, having a molecular weight of 3200 or larger and having a carboxy group, with isocyanate, exhibited more excellent performance on ice.

From the comparison between Examples 1 and 2 (comparison between aspects in which the specific composite bodies each further include a non-ionic surfactant having an amide group, and the coating layer of each of the specific composite bodies is a crosslinked body of an acrylonitrile butadiene copolymer having a carboxy group with isocyanate), Example 2, in which the coating layer of the specific composite body was a crosslinked body of an acrylonitrile butadiene copolymer, having a molecular weight of less than 3200 and having a carboxy group, with an isocyanate, exhibited more excellent wear resistance performance.

On the other hand, Comparative Examples 1 to 3, which contained no specific composite body, had insufficient performance on ice and wear resistance performance.

The invention claimed is:

1. A rubber composition for a tire, comprising:
100 parts by mass of a diene rubber; and
from 1 to 30 parts by mass of a thermally expandable microcapsule composite body, the thermally expandable microcapsule composite body containing one or more thermally expandable microcapsules and an acrylonitrile butadiene copolymer and/or a crosslinked body of the acrylonitrile butadiene copolymer covering the one or more thermally expandable microcapsules; wherein the thermally expandable microcapsule composite body further contains a non-ionic surfactant, and a content of the non-ionic surfactant is from 5 to 50 mass % relative to a content of the acrylonitrile butadiene copolymer and/or the crosslinked body of the acrylonitrile butadiene copolymer.

2. The rubber composition for a tire according to claim 1, further comprising a carbon black and/or a white filler.

3. The rubber composition for a tire according to claim 1, further comprising polymer microparticles having an average particle size of from 1 to 200 μm and being three-dimensionally crosslinked, wherein a content of the polymer microparticles is from 1 to 30 parts by mass relative to 100 parts by mass of the diene rubber.

4. The rubber composition for a tire according to claim 1, wherein a content of the thermally expandable microcapsules contained in the thermally expandable microcapsule composite body is from 1 to 15 parts by mass relative to 100 parts by mass of the diene rubber.

5. The rubber composition for a tire according to claim 1, wherein the thermally expandable microcapsule composite body contains the one or more thermally expandable microcapsules and the crosslinked body of the acrylonitrile butadiene copolymer covering the one or more thermally expandable microcapsules, and the crosslinked body is a crosslinked body of an acrylonitrile butadiene copolymer having a carboxy group or an amino group with an isocyanate.

6. The rubber composition for a tire according to claim 5, wherein the isocyanate is at least one type of an isocyanate selected from the group consisting of an isocyanate silane, a diisocyanate, and a polyfunctional isocyanate.

7. The rubber composition for a tire according to claim 1, wherein the one or more thermally expandable microcapsules are a plurality of thermally expandable microcapsules.

8. The rubber composition for a tire according to claim 7, wherein the plurality of thermally expandable microcapsules are connected in a linear, band-like, or tuft-like manner.

9. The rubber composition for a tire according to claim 7, wherein the thermally expandable microcapsule composite body contains the one or more thermally expandable microcapsules and the crosslinked body of the acrylonitrile butadiene copolymer covering the one or more thermally expandable microcapsules, and the crosslinked body is a crosslinked body of an acrylonitrile butadiene copolymer having a carboxy group or an amino group with an isocyanate.

10. The rubber composition for a tire according to claim 8, wherein the thermally expandable microcapsule composite body contains the one or more thermally expandable microcapsules and the crosslinked body of the acrylonitrile butadiene copolymer covering the one or more thermally expandable microcapsules, and the crosslinked body is a crosslinked body of an acrylonitrile butadiene copolymer having a carboxy group or an amino group with an isocyanate.

11. The rubber composition for a tire according to claim 9, wherein the isocyanate is at least one type of an isocyanate selected from the group consisting of an isocyanate silane, a diisocyanate, and a polyfunctional isocyanate.

12. The rubber composition for a tire according to claim 10, wherein the isocyanate is at least one type of an isocyanate selected from the group consisting of an isocyanate silane, a diisocyanate, and a polyfunctional isocyanate.

13. A studless tire comprising a tire tread portion formed from the rubber composition for a tire according to claim 1.

* * * * *